US009813015B1

(12) United States Patent
Kapla et al.

(10) Patent No.: US 9,813,015 B1
(45) Date of Patent: Nov. 7, 2017

(54) END CLAMP FOR MOUNTING SOLAR MODULE TO RAIL

(71) Applicant: SUNPOWER CORPORATION, San Jose, CA (US)

(72) Inventors: John Paul Kapla, Mill Valley, CA (US); Kyle Donald Feldmann, Richmond, CA (US); Dylan Benjamin, San Francisco, CA (US)

(73) Assignee: SUNPOWER CORPORATION, San Jose, CA (US)

( * ) Notice: Subject to any disclaimer, the term of this patent is extended or adjusted under 35 U.S.C. 154(b) by 0 days.

(21) Appl. No.: 15/196,599

(22) Filed: Jun. 29, 2016

(51) Int. Cl.
*E04D 13/18* (2014.01)
*H02S 20/23* (2014.01)
*H02S 30/10* (2014.01)
*B25B 5/14* (2006.01)
*B25B 5/16* (2006.01)

(52) U.S. Cl.
CPC .............. *H02S 20/23* (2014.12); *B25B 5/145* (2013.01); *B25B 5/163* (2013.01); *H02S 30/10* (2014.12)

(58) Field of Classification Search
CPC ......... H02S 20/23; H02S 30/10; B25B 5/163; B25B 5/145
USPC ........................................................ 52/173.3
See application file for complete search history.

(56) References Cited

U.S. PATENT DOCUMENTS

| 1,893,481 | A | * | 1/1933 | Adams ................. A47B 3/12 52/489.1 |
| 3,968,841 | A |   | 7/1976 | Harmathy |
| 4,005,557 | A |   | 2/1977 | Kramer et al. |
| 4,309,136 | A | * | 1/1982 | Talan ................... F16B 13/061 411/34 |
| 5,375,798 | A |   | 12/1994 | Hungerford, Jr. |
| 5,489,173 | A |   | 2/1996 | Höfle |
| 5,571,338 | A |   | 11/1996 | Kadonome et al. |
| 5,743,970 | A |   | 4/1998 | Czubatjy et al. |
| 5,746,839 | A |   | 5/1998 | Dinwoodie |
| 5,951,785 | A |   | 9/1999 | Uchihashi et al. |
| 5,953,869 | A |   | 9/1999 | Balfour et al. |

(Continued)

FOREIGN PATENT DOCUMENTS

| AU | 2002301823 B2 | 3/2002 |
| AU | 2008200493 B2 | 2/2008 |

(Continued)

OTHER PUBLICATIONS

International Search Report and Written Opinion mailed Apr. 24, 2013, issued in International Application No. PCT/US2012/069570 filed Apr. 24, 2013, 9 pages.

(Continued)

*Primary Examiner* — Basil Katcheves
(74) *Attorney, Agent, or Firm* — Oblon, McClelland, Maier & Neustadt, L.L.P.

(57) ABSTRACT

A solar power system may include rails, solar modules, and a plurality of clamps to secure the solar modules to the rails. An end clamp may be partially disposed inside a rail at an end of the rail. The end clamp may secure a solar module to the rail by coupling to the frame of the solar module. The end clamp may include a fastener that may be tightened to engage the end clamp and secure the solar module by holding it on top of the rail. The end clamp may establish an electrical grounding connection between the frame of the solar module and the rail.

20 Claims, 12 Drawing Sheets

(56) References Cited

U.S. PATENT DOCUMENTS

| | | | |
|---|---|---|---|
| 6,155,006 | A | 12/2000 | Mimura et al. |
| 6,495,750 | B1 | 12/2002 | Dinwoodie |
| 6,501,013 | B1 | 12/2002 | Dinwoodie |
| 6,672,018 | B2 | 1/2004 | Shingleton |
| 6,726,117 | B2 | 4/2004 | Herb et al. |
| 6,959,517 | B2 | 11/2005 | Poddany et al. |
| 6,959,520 | B2 | 11/2005 | Hartman |
| 7,435,134 | B2 | 10/2008 | Lenox |
| 7,780,472 | B2 | 8/2010 | Lenox |
| 7,856,769 | B2 | 12/2010 | Plaisted et al. |
| 7,900,407 | B2 | 3/2011 | Plaisted |
| 7,956,281 | B2 | 6/2011 | O'Brien et al. |
| 8,109,048 | B2 | 2/2012 | West et al. |
| 8,181,926 | B2 | 5/2012 | Magno, Jr. et al. |
| 8,375,654 | B1 | 2/2013 | West et al. |
| 8,376,298 | B2 | 2/2013 | McPheeters |
| 8,424,255 | B2 | 4/2013 | Lenox et al. |
| 8,462,518 | B2 | 6/2013 | Marroquin et al. |
| 8,469,644 | B2 | 6/2013 | Chang |
| 8,505,864 | B1 | 8/2013 | Taylor et al. |
| 8,650,813 | B2 | 2/2014 | Botkin et al. |
| 8,763,316 | B2 | 7/2014 | Concho et al. |
| 8,763,978 | B2 | 7/2014 | Newman et al. |
| 9,253,935 | B2 | 2/2016 | Morris et al. |
| 2004/0067121 | A1* | 4/2004 | Huang ............... F16B 13/025 411/32 |
| 2007/0199561 | A1 | 8/2007 | Soucy |
| 2007/0295391 | A1 | 12/2007 | Lenox et al. |
| 2008/0223432 | A1 | 9/2008 | Lee |
| 2009/0031640 | A1 | 2/2009 | Elmes et al. |
| 2009/0114270 | A1 | 5/2009 | Stancel |
| 2009/0114271 | A1 | 5/2009 | Stancel |
| 2009/0320906 | A1 | 12/2009 | Botkin et al. |
| 2010/0018571 | A1 | 1/2010 | Placer |
| 2010/0212715 | A1 | 8/2010 | Almy et al. |
| 2010/0276558 | A1 | 11/2010 | Faust et al. |
| 2011/0000544 | A1 | 1/2011 | West |
| 2011/0100434 | A1 | 5/2011 | Van Walraven |
| 2011/0126881 | A1 | 6/2011 | Hong et al. |
| 2011/0174947 | A1 | 7/2011 | Wu |
| 2011/0192098 | A1 | 8/2011 | Chung |
| 2011/0214365 | A1 | 9/2011 | Aftanas |
| 2011/0232715 | A1 | 9/2011 | Lenox et al. |
| 2011/0265401 | A1 | 11/2011 | Ritzler et al. |
| 2011/0289750 | A1 | 12/2011 | Kats et al. |
| 2011/0290306 | A1 | 12/2011 | Roberts |
| 2012/0102853 | A1 | 5/2012 | Rizzo |
| 2012/0125410 | A1 | 5/2012 | West et al. |
| 2012/0167957 | A1 | 7/2012 | Verfuerth et al. |
| 2012/0199181 | A1 | 8/2012 | Newman et al. |
| 2012/0205508 | A1 | 8/2012 | Cusson et al. |
| 2012/0227791 | A1 | 9/2012 | Vari |
| 2012/0234378 | A1 | 9/2012 | West et al. |
| 2012/0248271 | A1 | 10/2012 | Zeilenga |
| 2012/0255598 | A1 | 10/2012 | West |
| 2012/0260972 | A1 | 10/2012 | West et al. |
| 2012/0279558 | A1 | 11/2012 | West et al. |
| 2012/0298186 | A1 | 11/2012 | West |
| 2012/0298817 | A1 | 11/2012 | West et al. |
| 2012/0301661 | A1 | 11/2012 | West et al. |
| 2013/0011187 | A1 | 1/2013 | Schuit et al. |
| 2013/0020455 | A1 | 1/2013 | Sizelove et al. |
| 2013/0111830 | A1 | 5/2013 | Aseere et al. |
| 2013/0140416 | A1 | 6/2013 | West et al. |
| 2013/0180572 | A1 | 7/2013 | West |
| 2013/0180573 | A1 | 7/2013 | West |
| 2013/0192150 | A1 | 8/2013 | DuPont et al. |
| 2013/0200245 | A1 | 8/2013 | Markiewicz et al. |
| 2013/0313209 | A1 | 11/2013 | Barth |
| 2013/0320166 | A1 | 12/2013 | Kemple et al. |
| 2014/0091050 | A1 | 4/2014 | Zhang |
| 2015/0144181 | A1 | 5/2015 | Gilchrist et al. |
| 2015/0144760 | A1 | 5/2015 | Paradiso |
| 2015/0180404 | A1 | 6/2015 | Braunstein et al. |
| 2015/0188486 | A1 | 7/2015 | Marroquin |
| 2015/0200621 | A1 | 7/2015 | Reed et al. |
| 2015/0249423 | A1 | 9/2015 | Braunstein et al. |

FOREIGN PATENT DOCUMENTS

| | | |
|---|---|---|
| AU | 2011226964 A1 | 10/2011 |
| DE | 299 19 145 U1 | 1/2000 |
| DE | 202 04 146 U1 | 5/2002 |
| DE | 20 2005 006 951 U1 | 9/2005 |
| DE | 20 2005 015 455 U1 | 3/2007 |
| DE | 20 2009 003 667 U1 | 8/2009 |
| DE | 20 2010 011 235 U1 | 11/2010 |
| DE | 20 2011 001 761 U1 | 5/2011 |
| DE | 20 2011 005 287 U1 | 10/2011 |
| EP | 1 647 782 A2 | 4/2006 |
| EP | 2 239 783 A1 | 10/2010 |
| EP | 2 302 694 B1 | 3/2011 |
| EP | 2 495 508 A2 | 9/2012 |
| FR | 2 935 410 A1 | 3/2010 |
| FR | 2 989 153 | 10/2013 |
| GB | 1 563 709 A | 3/1980 |
| JP | S57-87561 | 6/1982 |
| JP | 06-221316 | 8/1994 |
| JP | H10-122125 | 5/1998 |
| JP | H10-159284 | 6/1998 |
| JP | H11-222991 | 8/1999 |
| JP | H11-247387 | 9/1999 |
| JP | 2000-087515 | 3/2000 |
| JP | 2000-220268 | 8/2000 |
| JP | 2000-303638 | 10/2000 |
| JP | 2000-345664 | 12/2000 |
| JP | 2001-144314 | 5/2001 |
| JP | 2004-251037 | 9/2004 |
| JP | 2010-242367 | 10/2010 |
| JP | 2011-236609 | 11/2011 |
| JP | 2011-236611 | 11/2011 |
| JP | 4829259 B2 | 12/2011 |
| JP | 2012-001908 | 1/2012 |
| JP | 2012-001909 | 1/2012 |
| JP | 4856279 B1 | 1/2012 |
| JP | 2012-102544 | 5/2012 |
| JP | 2012-144939 | 8/2012 |
| KR | 2011-0058294 | 6/2011 |
| WO | WO 2010/056464 A1 | 5/2010 |
| WO | WO 2010/112049 A1 | 10/2010 |
| WO | WO 2011/085786 A2 | 7/2011 |
| WO | WO 2011/119245 | 9/2011 |
| WO | WO 2011/139660 A1 | 11/2011 |
| WO | WO 2012/019907 A1 | 2/2012 |

OTHER PUBLICATIONS

International Search Report and Written Opinion mailed Apr. 7, 2015, issued in International Application No. PCT/US2014/070369 filed Dec. 15, 2014, 13 pages.

International Search Report and Written Opinion mailed May 22, 2015, issued in International Application No. PCT/US2015/017444 filed Feb. 25, 2015, 12 pages.

* cited by examiner

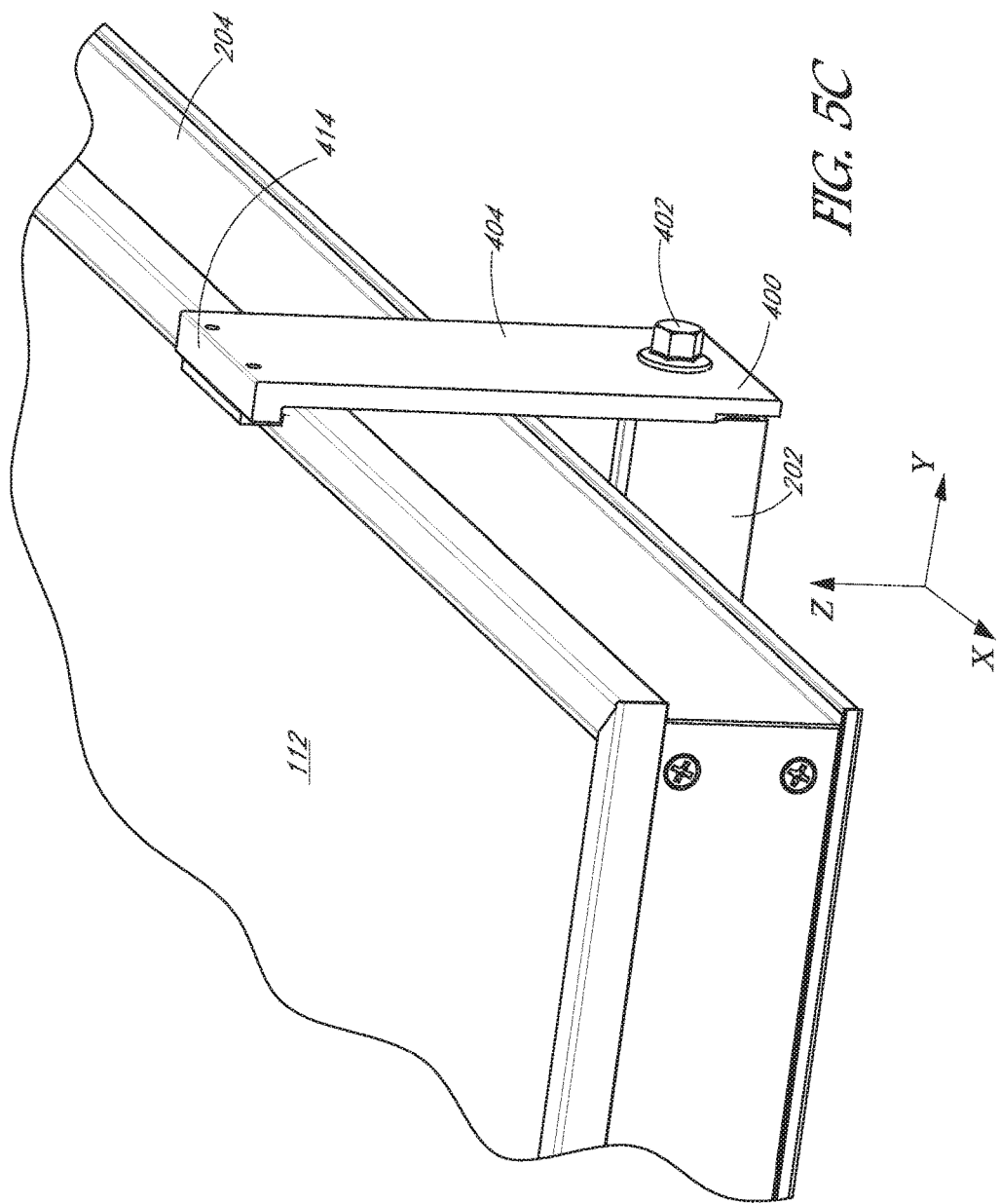

END CLAMP FOR MOUNTING SOLAR MODULE TO RAIL

BACKGROUND

Solar power has long been viewed as an important alternative energy source. To this end, substantial efforts and investments have been made to develop and improve upon solar energy collection technology. Of particular interest are residential-, industrial- and commercial-type applications in which relatively significant amounts of solar energy can be collected and utilized in supplementing or satisfying power needs. One way of implementing solar energy collection technology is by assembling an array of multiple solar modules.

One type of solar energy system is a solar photovoltaic system. Solar photovoltaic systems ("photovoltaic systems") can employ solar panels made of silicon or other materials (e.g., III-V cells such as GaAs) to convert sunlight into electricity. Photovoltaic systems typically include a plurality of photovoltaic (PV) modules interconnected with wiring to one or more appropriate electrical components (e.g., switches, inverters, junction boxes, etc.).

A typical conventional PV module includes a PV laminate or panel having an assembly of crystalline or amorphous semiconductor devices ("PV cells") electrically interconnected and encapsulated within a weather-proof barrier. One or more electrical conductors are housed inside the PV laminate through which the solar-generated current is conducted.

Regardless of an exact construction of the PV laminate, most PV applications entail placing an array of solar modules at the installation site in a location where sunlight is readily present. This is especially true for residential, commercial, or industrial applications in which multiple solar modules are desirable for generating substantial amounts of energy, with the rooftop of the structure providing a convenient surface at which the solar modules can be placed.

In some arrangements, solar modules are placed side-by-side in an array. Each solar module can be mounted to a support structure, such as a roof, by coupling the module to a mounting structure (e.g., a rail) by way of a coupling member (e.g., a clamp, clip, anchor or mount). It can be challenging to couple modules side-by-side because the array assembler typically engages the coupling member while also ensuring that adjacent modules are positioned properly on the mounting structure. Accordingly, there remains a continuing need for improved systems and methods for mounting solar modules to a support structure.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 5C is a perspective side view of an alternative engaged end clamp inserted into an end of a rail and securing a module to the exterior top surface of the rail in accordance with the disclosed embodiments;

SUMMARY

Figure 1:
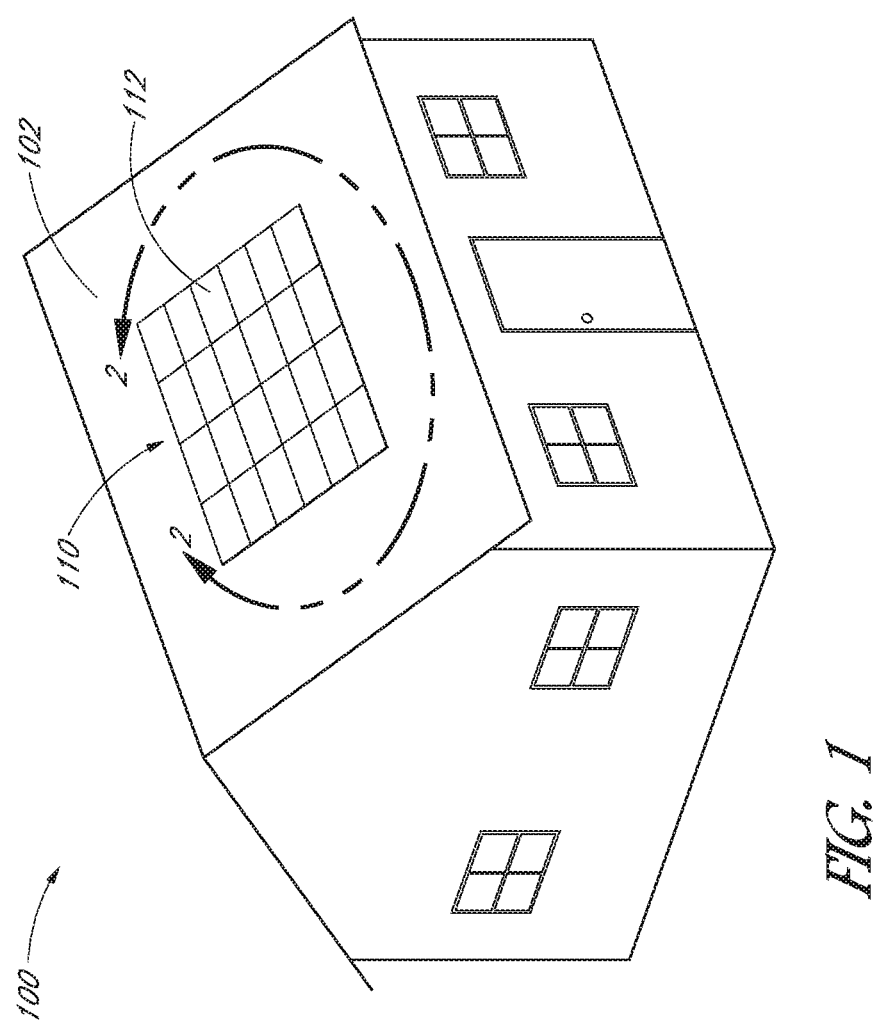
FIG. 1 is a schematic perspective view of a solar power system comprising an array of solar modules mounted to a support structure.

Embodiments may include a solar power system comprising: a rail having an end, an interior top surface, an interior bottom surface, and an exterior top surface; a solar module disposed atop the exterior top surface of the rail; and an end clamp, at least a portion of the end clamp disposed inside the rail at the end of the rail, the end clamp comprising: a fastener having a head end and a tail end; a clamping plate disposed at least partially outside of the rail comprising a clamping plate wedge disposed inside the rail, wherein the clamping plate secures the solar module to the exterior top surface of the rail, an inner wedge disposed inside the rail and coupled to the interior bottom surface, a block disposed between and engaged with the clamping plate wedge and inner wedge, wherein the tail end of the fastener is engaged with the inner wedge to apply a first force in a first horizontal direction on the inner wedge, wherein the head end of the fastener is engaged with the clamping plate to apply a second force in a second horizontal direction on the clamping plate, and wherein the inner wedge and clamping plate wedge impart a vertical force onto the block in a vertical direction to cause the block to engage with the interior top surface.

Embodiments may also include a solar power system comprising: a first rail having an end, an interior top surface, an interior bottom surface, and an exterior top surface; a second rail having an end, an interior top surface, an interior bottom surface, and an exterior top surface; a solar module disposed atop the first rail and the second rail; and a first end clamp disposed at least partially inside the first rail at the end of the first rail and a second end clamp disposed at least partially inside the second rail at the end of the second rail, each of the first and second end clamps comprising: a fastener having a head end and a tail end; a clamping plate disposed at least partially outside of the rail comprising a clamping plate wedge disposed inside the rail, wherein the clamping plate secures the solar module to the exterior top surface of the rail, an inner wedge disposed inside the rail coupled to the interior bottom surface, a block disposed between and engaged with the clamping plate wedge and inner wedge, wherein the tail end of the fastener is engaged with the inner wedge to apply a first force in a first horizontal direction on the inner wedge, wherein the head of the fastener is engaged with the clamping plate to apply a second force in a second horizontal direction on the clamping plate, and wherein the inner wedge and clamping plate wedge cooperate to impart a vertical force onto the block in a vertical direction to cause the block to engage with the interior top surface.

Embodiments may further include an end clamp for securing a solar module to a rail, the end clamp comprising: a fastener having a head end and a tail end; a clamping plate adapted to be disposed at least partially outside of the rail comprising a clamping plate wedge adapted to be disposed inside the rail, wherein the clamping plate is adapted to secure the solar module to the top of the rail, an inner wedge adapted to be disposed inside the rail coupled to the interior bottom surface, a block disposed between and engaged with the clamping plate wedge and inner wedge, wherein the tail end of the fastener is engaged with the inner wedge to apply a first force in a first horizontal direction on the inner wedge, the head of the fastener is engaged with the clamping plate to apply a second force in a second horizontal direction on the clamping plate, and the inner wedge and clamping plate wedge deflect the first force and second force onto the block in the vertical direction.

DETAILED DESCRIPTION

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. §112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" solar module does not necessarily imply that this solar module is the first solar module in a sequence; instead the term "first" is used to differentiate this solar module from another solar module (e.g., a "second" solar module).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In the following description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present disclosure.

Figure 2:
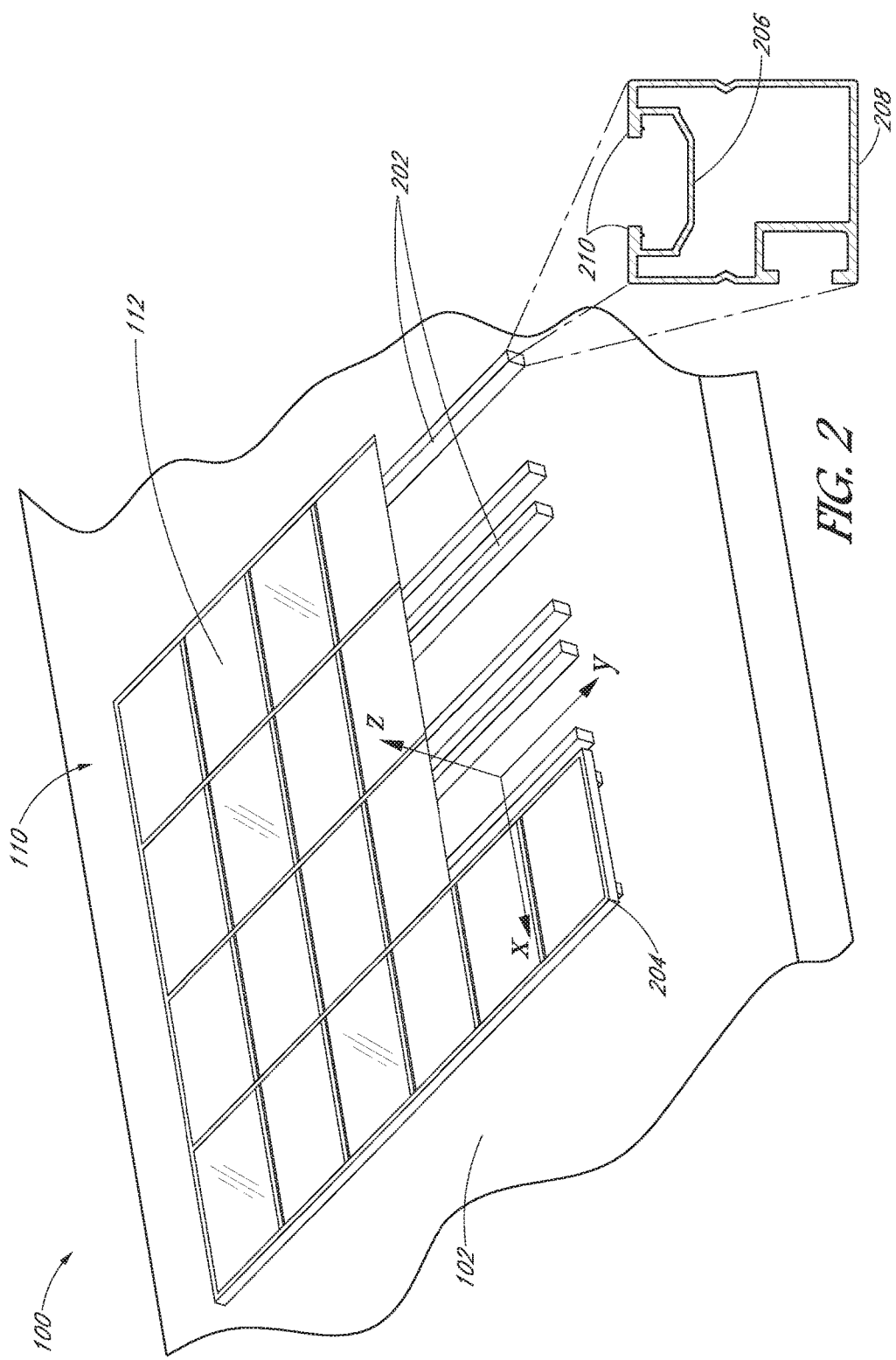
FIG. 2 is a magnified perspective view of the solar power system illustrated in FIG. 1.

FIG. 1 is a schematic perspective view of a solar power system 100 comprising an array 110 of solar modules 112 mounted to a support structure 102. FIG. 2 is a magnified perspective view of the solar power system 100 illustrated in FIG. 1. The system 100 of FIGS. 1-2 is illustrated as being coupled to a support structure 102 that comprises a roof of a building, such as a residential, commercial, industrial structure, etc.

The solar module 112 can include a photovoltaic (PV) laminate or panel having an assembly of crystalline or amorphous semiconductor devices ("PV cells") electrically interconnected and encapsulated within a weather-proof barrier that includes a frame 204. The solar modules 112 can be mounted on and coupled to spaced apart rails 202 that extend across the support structure 102. The rails 202 can mechanically couple to the support structure 102 by way of an anchor in some embodiments. The rails 202 and frame 204 may comprise any of a number of suitable materials including aluminum, steel, or stainless steel. Either or both of the rails 202 and frame 204 may be anodized, painted, or otherwise coated with one or more layers to protect against corrosion, wear, etc. As discussed herein, the rail 202 may be hollow (e.g., having one or more fully or partially enclosed chambers in the rail) throughout the entire length of the rail 202. Additionally or alternatively, the rail 202 may be hollow, solid, or a combination of the two with openings at one or more ends of the 202 adapted to receive an end clamp 400 or 600 as discussed herein. FIG. 2 also includes a zoomed-in side view of the end of a rail 202. The rail 202 may include one or more interior top surfaces 206, one or more interior bottom surfaces 208, and one or more exterior top surfaces 210. Additionally or alternatively, the rail 202 may include some or all of the features of the rails disclosed in U.S. patent application Ser. No. 14/139,755, which is hereby incorporated herein in its entirety and for all purposes, (e.g., the rails 114 or 614 disclosed in FIGS. 9A-9G and 15A-15E and the accompanying paragraphs).

As shown in FIG. 2, a global x-y-z coordinate system can be defined across the support structure 102. For example, the rails 202 can extend along a length in the y-direction, and the array 110 can be positioned atop the rails 202 in the x-y plane. As used herein, the x-y-z coordinate system shown in FIG. 2 defines a global frame of reference for the solar modules 112 and other components disclosed herein. The solar modules 112 may be secured to the rails 202 by one or more end clamps (e.g., the end clamp 400 or end clamp 600 discussed herein) and/or by one or more mid clamp assemblies disposed between adjacent solar modules 112 such as those disclosed in U.S. patent application Ser. No. 14/139,755. In some embodiments, the array 110 may include a row with a single solar module 112 that is secured to the rails 202 only by end clamps (e.g., the end clamp 400 or end clamp 600 discussed herein) without any mid clamp assemblies.

Figure 3:
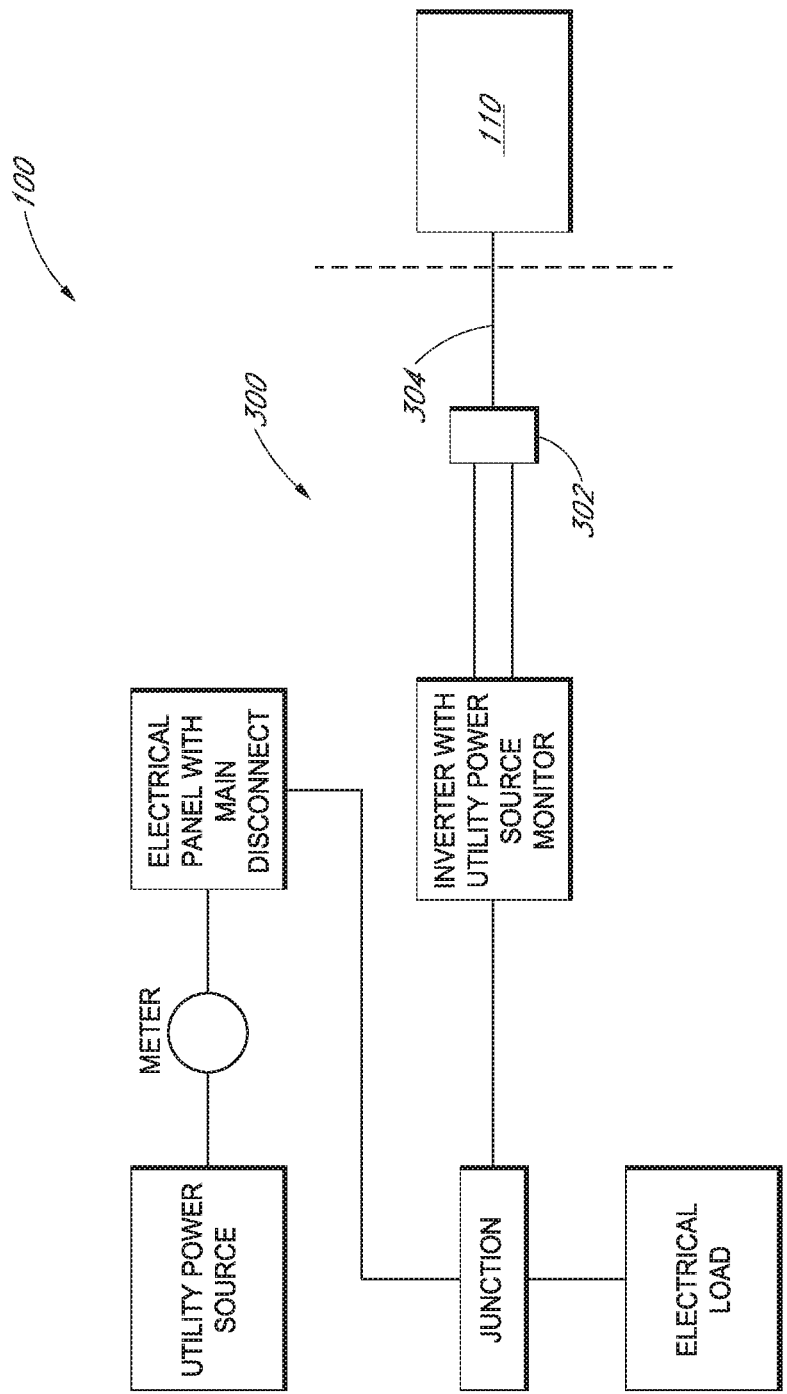
FIG. 3 is a schematic diagram of an optional electrical system connected to the array.

FIG. 3 is a schematic diagram of an optional electrical system 300 connected to the array. The solar power system 100 can be incorporated into the electrical system 300 connected to the array 110. For example, the electrical system 300 can include the array 110 as a power source connected to a remote connection device 302 with power lines 304. The electrical system 300 can also include a utility power source, a meter, an electrical panel with a main disconnect, a junction, electrical loads, and/or an inverter with the utility power source monitor.

Figure 4A:
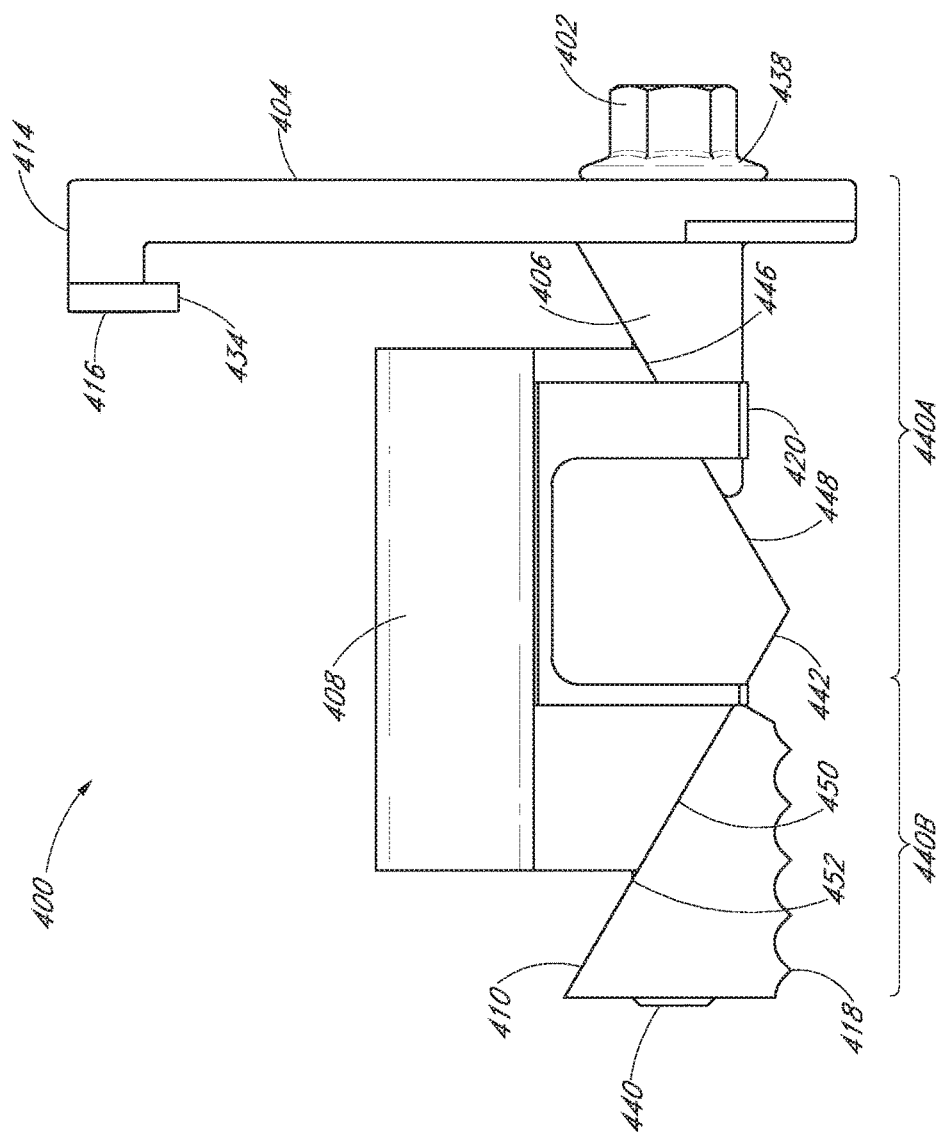
FIG. 4A is a side view of an end clamp, according to various embodiments.

Referring now to FIG. 4A, a side view of an end clamp 400 is shown. The end clamp 400 may include a fastener 402, a clamping plate 404, a block 408, and an inner wedge 410. The fastener 402 may be a bolt, screw, or other suitable fastener 402. The fastener 402 may include a head end 438 to make contact with a tool to tighten the fastener 402 and a tail end 440. Discussed herein the tail end 440 of the fastener 402 may include a non-threaded portion 440A and a threaded portion 440B. The fastener 402 may also include one or more grounding teeth (not shown) to break the anodization (if present) of the clamping plate 404. By breaking the anodization of the clamping plate 404, the fastener 402 may thereby enable an electrical grounding path through the clamping plate 404 into the fastener 402. The fastener 402 may be made of any of a number of suitable materials including steel, stainless steel, or other metals. The fastener 402 may be anodized, painted, or otherwise colored black to match the shade of the clamping plate 404 and/or the rail 202.

Figure 4B:
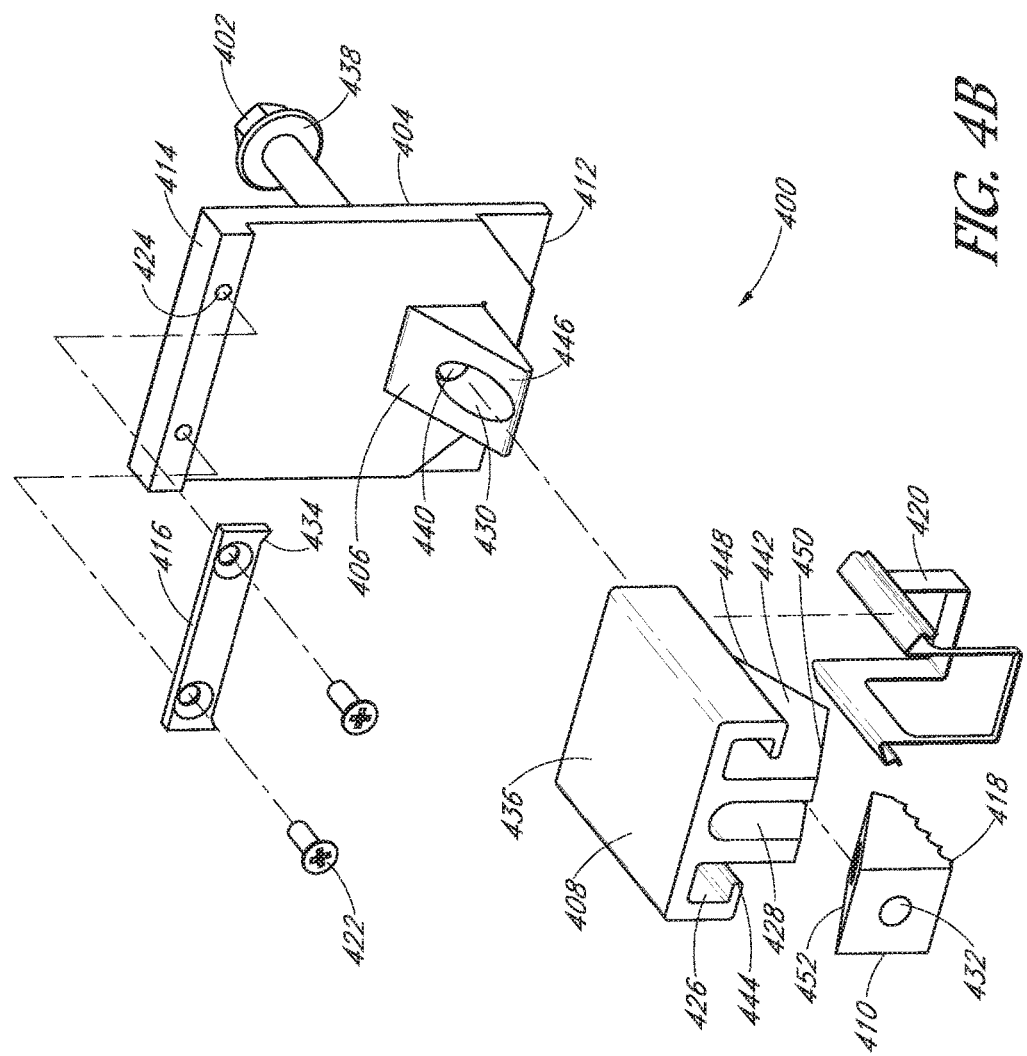
FIG. 4B is an exploded perspective view of the end clamp of FIG. 4A.
Figure 4C:
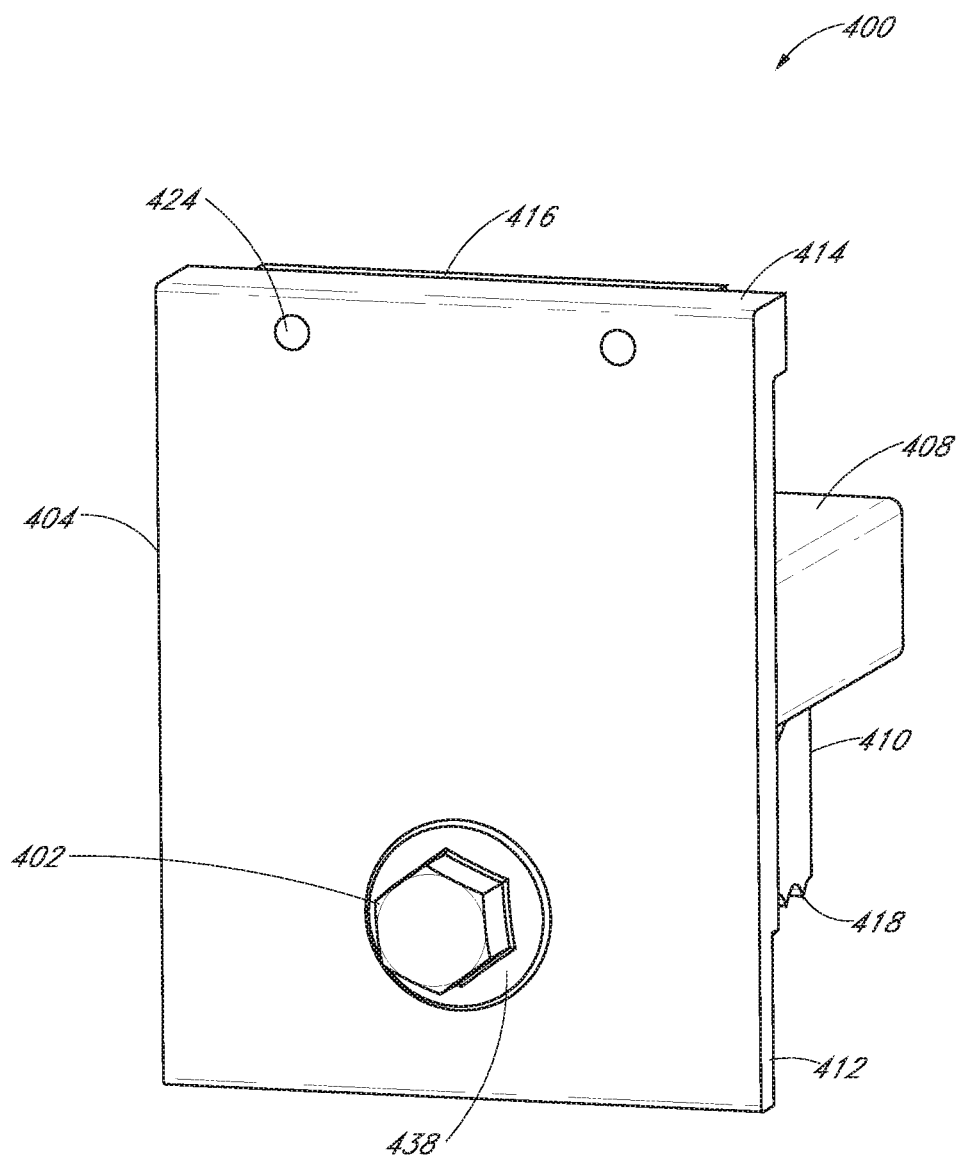
FIG. 4C is a perspective front view of the end clamp of FIG. 4A.

The clamping plate 404 may include a clamping plate wedge 406. The clamping plate wedge 406 may include a wedge surface 446. The clamping plate 404 may include a portion extending vertically from the fastener 402. This vertically extending portion may include a lip 414 and a grounding plate 416. As discussed herein, the grounding plate 416 may include one or more grounding teeth 434. Beneath the fastener 402 on the clamping plate 404, the clamping plate 404 may include one or more drainage features 412 (e.g., cutaways, apertures, etc.) to allow for liquid to drain from the rail 202 when the end clamp 400 is inserted into the rail 202. As discussed herein, the clamping plate 404 may include an aperture 430 adapted to receive the fastener 402. The aperture 430 may be recessed into the surface of the clamping plate 404, substantially level with the clamping plate 404 (as shown in FIGS. 4A-4C), or the aperture 430 may be disposed within a feature protruding from the surface of the clamping plate 404 in the opposite direction from the clamping plate wedge 406. The clamping plate 404 may comprise any of a number of suitable materials including steel, stainless steel, aluminum, electrically conductive polymer, and/or electrically conductive composite material. If the clamping plate 404 comprises aluminum or steel, stainless steel, the aluminum may be anodized with a black color to match the shade of the rail 202. The grounding plate 416 may comprise stainless steel or other suitable electrically conductive material.

The block 408 includes a flat top side and a wedge-shaped bottom side 442 with a first wedge surface 448 and a second wedge surface 450. The first wedge surface 448 of the wedge-shaped bottom side 442 of the block 408 may be engaged with the wedge surface 446 of the clamping plate wedge 406 and the second wedge surface 450 of the wedge-shaped bottom side 442 of the block 408 may be engaged with the wedge surface 452 of the inner wedge 410. Structurally, the wedge surface 446 of the clamping plate wedge 406 and the first wedge surface 448 of the block 408 may be shaped to mate with and bear against one another. Additionally, the wedge surface 452 of the inner wedge 410 and the second wedge surface 450 of the block 408 may be shaped to mate with and bear against one another. The block 408 may comprise aluminum, steel, stainless steel, polymer, and/or composite material. The block 408 may be coupled to a bracket 420. The bracket 420 may extend to a lip of the block 408 and secure the block 408 to the clamping plate wedge 406. By coupling the block 408 to the clamping plate wedge 406, bracket 420 may hold the end clamp 400 together prior to installation inside the rail 202, thereby making installation easier for a technician. The bracket 420 may be made of any of a number of suitable materials including aluminum, steel, stainless steel, polymer, and/or composite material.

The inner wedge 410 may include a wedge surface 452 and one or more points 418. While five points 418 are shown in FIG. 4A, it will be understood that fewer than five points 418 or more than five points 418 may be used. The one or more points 418 extend vertically from the inner wedge 410 in a downward direction. The one or more points 418 may be triangular prisms disposed on the underside of the inner wedge 410 and extending the width of the inner wedge 410 or they may be one or more rows of pyramidal structures disposed on the underside of the inner wedge 410. The inner wedge 410 may include an aperture 432 as discussed herein. The inner wedge 410 may be made of any of a number of suitable materials including steel, stainless steel, aluminum, electrically conductive polymer, and/or electrically conductive composite material.

Referring now to FIG. 4B, an exploded perspective view of the end clamp 400 is shown. FIG. 4B illustrates the components shown in FIG. 4A as well as additional components. As discussed herein, the clamping plate 404, block 408, and inner wedge 410 may include apertures 430, 428, and 432, respectively, to receive the fastener 402. The aperture 430 may be recessed beneath the surface of the clamping plate 404, substantially level with the surface of the clamping plate 404, or the aperture 430 may be disposed within a feature protruding from the surface of the clamping plate 404. The apertures 430 and 428 in the clamping plate 404 and block 408 may be unthreaded. The aperture 432 in the inner wedge 410 may be threaded. The threaded aperture 432 of the inner wedge 410 may receive the threaded portion of the fastener 402 to secure the fastener 402. If the aperture 430 is recessed beneath the surface of the clamping plate 404, the head end 438 of the fastener 402 may be disposed at least partially within the recess.

The grounding plate 416 may include one or more apertures 424 to receive one or more fasteners 422 (e.g., screws, bolts, rivets, etc.). The fasteners 422 may secure the grounding plate 416 to the clamping plate 404 via one or more apertures 424 of the lip 414. The apertures 424 may also serve to break the anodization layer of the clamping plate 404 if present, enabling an electrical grounding path from the grounding plate 416 to the fastener 402. As shown in FIG. 4B, the grounding plate 416 includes one or more grounding teeth 434. The grounding teeth 434 may comprise points vertically extending from the grounding plate 416. While only two grounding teeth 434 are shown in FIG. 4B, it will be understood that different numbers of grounding tooth (e.g., one, three, four, etc.) may be included in the grounding plate 416. As discussed herein, the grounding teeth 434 may pierce the anodization layer (if present) of the frame 204 thereby creating an electrical grounding path from the frame 204 to the grounding plate 416 and then to the clamping plate 404.

The block 408 may include a substantially rectangularly-shaped top 436, and one or more wings 426 extending vertically down from the top 436 of the block 408. Each wing 426 may include a lip portion 444 extending horizontally from the end of the wing 426 distal from the top 436. The one or more wings 426 may receive and be coupled to the bracket 420 as discussed herein.

Referring now to FIG. 4C, a perspective front view of the end clamp 400 is shown. FIG. 4C illustrates a number of the components shown in FIG. 4A and FIG. 4B shown from a different viewpoint. As shown in FIG. 4C, the head end 438 of fastener 402 may comprise a hexagonal bolt head with a separate washer or a hexagonal bolt head with a build-in washer. It will be understood, of course, that any suitable head ends 438 may be used (e.g., a countersunk head screw, a rounded head screw, slotted hexagonal bolt, etc.). As discussed herein, the head end 438 of the fastener 402 may include one or more grounding teeth (not shown) which may pierce the anodization layer of the clamping plate 404 to establish an electrical grounding connection.

Figure 5A:
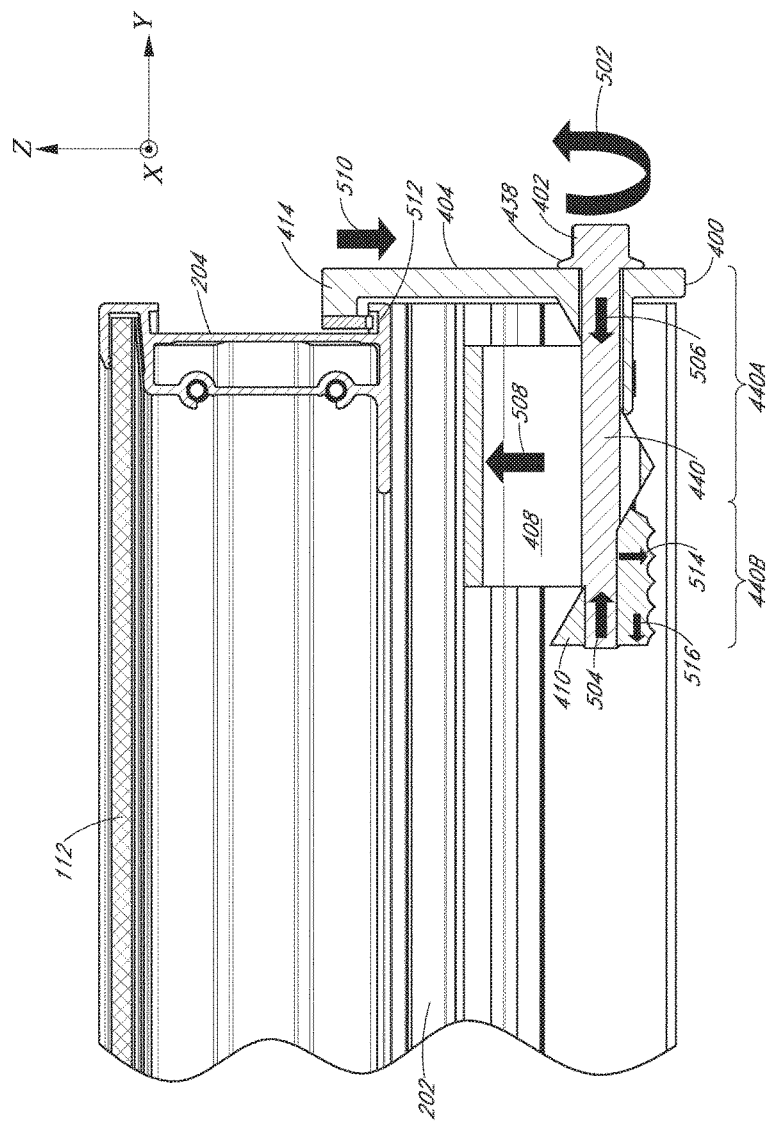
FIG. 5A is a cutaway side view of an end clamp inserted into a rail in accordance with various disclosed embodiments.

Referring now to FIG. 5A, a cutaway side view of an end clamp 400 inserted into a rail 202 and securing a module 112 to an exterior top surface of the rail 202 is shown. The module 112 includes a frame 204 as discussed herein. The frame 204 may include a lip 512 extending horizontally from the bottom end of the frame 204. The end of the lip 512 distal from the rest of the frame 204 may include a vertically extending portion. One or more technicians installing the array 110 may insert the end clamp 400 into the rail 202 and ensure that the lip 414 of the clamping plate 404 of the end clamp 200 extends over the lip 512 of the frame 204. As shown in FIG. 5A the clamping plate 404 is disposed outside of the rail 202 and the clamping plate wedge 406, block 408, and inner wedge 410 are disposed inside one end of the rail 202. The head end 438 of the fastener 402 is disposed outside the rail 202 and most of the tail end 440 of the fastener 402 is disposed inside the end of the rail 202.

The end clamp 400 may be initially installed with the fastener 402 in a disengaged state (i.e., the fastener 402 may be loosely coupled to the rest of the end clamp 400 such that the components of the end clamp 400 are not tightly coupled together). Using a tool (e.g., a wrench, a socket wrench, a screwdriver, etc.) a technician may apply a tightening force 502 to the head end of the fastener 402. The tightening force 502 may cause the fastener 402 to rotate, thus engaging the threaded portion 440B of the tail end 440 of the fastener 402 with the threaded aperture 432. The tension on the fastener 402 between the head end 438 and the threaded portion 440B of the tail end 440 of the fastener 402 generates a horizontal force 504 directed toward the clamping plate 404 and the resultant horizontal force 506 directed into the rail 202, e.g., the resultant horizontal force 506 can be imparted horizontally against the outermost end of the rail 202.

The horizontal forces 504 and 506 pull the inner wedge 410 toward the clamping plate 404 and the clamping plate wedge 406, causing the wedge surface 446 of the clamping plate wedge 4086 to bear against the first wedge surface 448 of the block 408 and the wedge surface 452 of the inner wedge 410 to bear against the second wedge surface 450 of the block 408. A portion of the horizontal forces 504 and 506 is deflected by the inner wedge 410 and the clamping plate wedge 406 upward through the block 408 via by the wedge-shaped bottom portion 442 of the block 408 generating a vertical force 508. The vertical force 508 pushes the block 408 upward toward the interior top surface of the rail 202. Accordingly, the vertical force 508 creates tension on the end clamp 400 resulting in vertical forces 510 and 514. The vertical force 510 pulls the clamping plate 404 downward. Because the lip 414 of the clamping plate 404 is disposed over the lip 512 of the frame 204, the downward force 510 causes the clamping plate 404 to apply downward pressure to the frame 204, thus securing the frame 204 to the rail 202. The vertical force 514 applies downward pressure on the inner wedge 410 and the one or more points 418. The vertical force 514 and horizontal force 504 acting through the one or more points 418 results in a friction force 516 opposing the horizontal force 504.

As discussed herein, the tightening force 502 may cause one or more grounding teeth of the fastener 402 to pierce the anodization layer of the clamping plate 404. The downward vertical force 510 may cause the grounding teeth 434 to pierce the anodization layer of the frame 204 as discussed herein. The friction force 516 resulting from the one or more points 418 acting on the lower inside surface of the rail 202 may also result in the one or more points 418 piercing the anodization layer of the interior bottom surface of the rail 202 (e.g., by scratching or scraping). Accordingly an electrical grounding path may be established from the frame 204, through the grounding plate 416, through the one or more fasteners 422, through the one or more apertures 424, through the clamping plate 404, through the fastener 402, through the inner wedge 410, and to the rail 202.

Figure 5B:
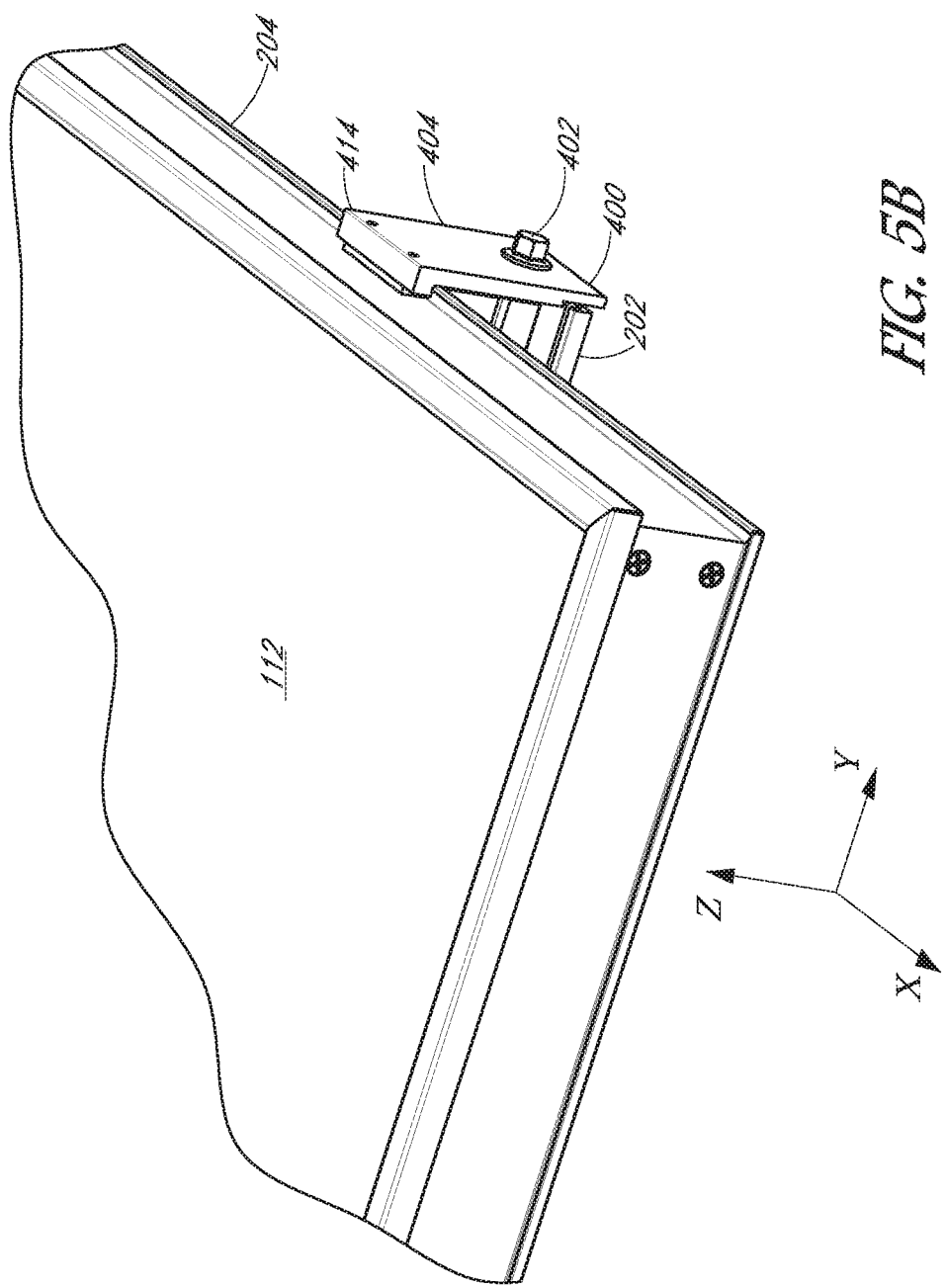
FIG. 5B is a perspective side view of an engaged end clamp inserted into an end of a rail and securing a module to the exterior top surface of the rail in accordance with the disclosed embodiments.

Referring now to a FIG. 5B, a perspective side view of an engaged end clamp 400 inserted into an end of the rail 202 and thus securing a module 112 to the exterior top surface of the rail 202 is shown. As shown in FIG. 5B, the frame 204 of the module 112 includes a lip 512. As discussed herein, the clamping plate 204 of the end clamp 400 may include a lip 414 which may couple to the lip 512 and thereby secure the frame 204 to the exterior top surface of the rail 202 when the end clamp 400 is engaged. As shown in FIG. 5B, the clamping plate 404 covers substantially all of the end of the rail 202. As discussed herein, the end clamp 400 may include one or more drainage features 412 to allow liquid to drain out of the rail 202.

Referring now to FIG. 5C, an alternative embodiment of an engaged end clamp 400 inserted into and end of the rail 202 and thus securing a module 112 to the exterior top surface of the rail 202 is shown. In the embodiment shown in FIG. 5C, the frame 204 of the module 112 does not include a lip 512. To accommodate this lipless frame 204, the clamping plate 404 at the end clamp 400 may be extended so as to be longer than the clamping plate 404 of FIGS. 5A-5C. In the embodiment shown in FIG. 5C, the clamping plate 404 may extend vertically upward over the top of the frame 204. When the end clamp 400 is engaged as discussed herein, the lip 414 of the clamping plate 404 may apply a downward force 510 to the top of the frame 204 (instead of to a lip 512 as shown in FIGS. 5A and 5B). Additionally the grounding teeth 434 of the clamping plate 404 may pierce the anodization layer of the top of the frame 204 to establish a grounding path. As shown in FIG. 5C the clamping plate 404 covers substantially all of the end of the rail 202. As discussed herein, the end clamp 400 may include one or more drainage features 412 to allow liquid to drain out of the rail 202.

Figure 6A:
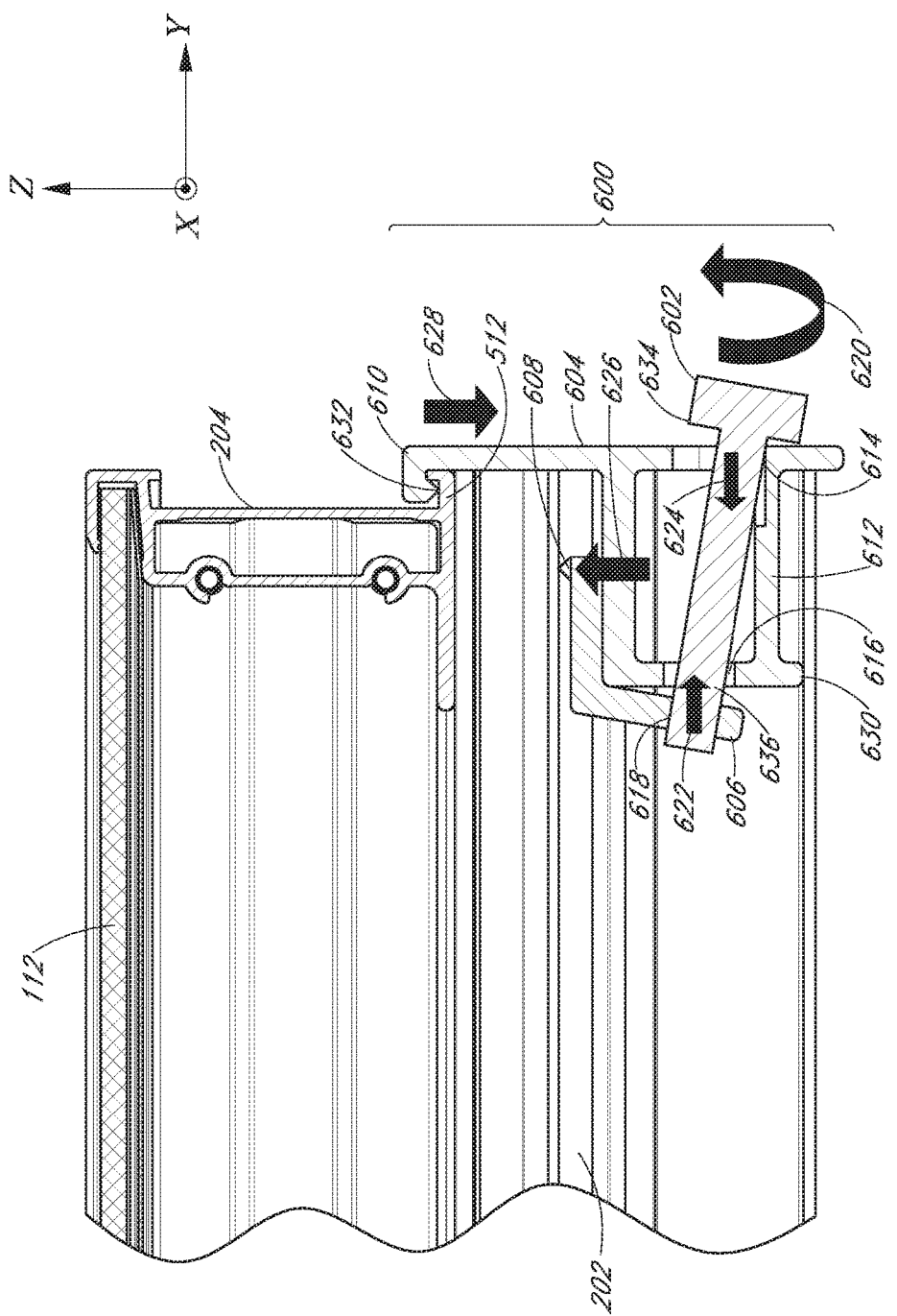
FIG. 6A is a cutaway side view of an alternative end clamp inserted into a rail in accordance with the disclosed embodiments.

Referring now to FIG. 6A, a cutaway side view of an alternative end clamp 600 inserted into a rail 202 and securing a module 112 to the exterior top surface of the rail 202 is shown. Unlike the wedge-shaped design of the end clamp 400 discussed herein, the end clamp 600 comprises a toggle-based design. The end clamp 600 includes a fastener 602, a clamping plate 604, and a toggle 606. The fastener 602 may be a bolt, screw, or other suitable fastener 602. The fastener 602 may include a head end 634 to make contact with a tool to tighten the fastener 602 and a tail end 636. The head end 634 of fastener 602 may comprise a hexagonal bolt head with a separate washer or a hexagonal bolt head with a build-in washer. It will be understood, of course, that any suitable head ends 634 may be used (e.g., a countersunk head screw, a rounded head screw, slotted hexagonal bolt, etc.). As discussed herein, the tail end 636 of the fastener 602 may include a non-threaded portion 636A and a threaded portion 636B. The fastener 602 may also include one or more grounding teeth (not shown) to break the anodization (if present) of the clamping plate 604. By breaking the anodization of the clamping plate 604, the fastener 602 may thereby enable an electrical grounding path through the clamping plate 604 into the fastener 602. The fastener 602 may be made of any of a number of suitable materials including steel, stainless steel, or other metals. The fastener 602 may be anodized, painted, or otherwise colored black to match the shade of the clamping plate 604 and/or the rail 202.

The clamping plate 604 may be shaped like a lowercase 'd' (as shown in the side sectional view of FIG. 6A) with an elongated vertical portion extending upward from an aperture 614 that receives the fastener 602. The elongated vertical portion of the clamping plate 604 may also include a lip 610. Similar to the lip 412 of the end clamp 400, the lip 610 of the end clamp 600 may extend over a lip 512 of the frame 204. The lip 610 may include one or more grounding teeth 632. The grounding teeth 632 may comprise one or more points vertically extending from the lip 610. It will be understood that different numbers of grounding tooth (e.g., one, three, four, etc.) may be included in the grounding plate 416. The grounding teeth 632 may pierce the anodization layer (if present) of the frame 204 thereby creating an electrical grounding path from the frame 204 to the grounding plate 416 and then to the clamping plate 404. The clamping plate 604 may comprise any of a number of suitable materials including steel, stainless steel, aluminum, electrically conductive polymer, and/or electrically conductive composite material.

Substantially all of the inner portion 612 of the clamping plate 604 may be disposed inside an end of the rail 202 when the end clamp 600 is installed. The inner portion 612 includes a top and a bottom. The inner portion 602 may also include a second aperture 616 that also receives the fastener 602. When the end clamp 600 is engaged, the bottom of the inner portion 612 may contact the interior lower surface 208 of the rail 202. The inner portion 612 may also one or more features 630 disposed at the bottom end of the inner portion 612 distal from clamping plate 604. The one or more features 630 may be a rectangular prism that is coupled to the interior bottom surface 208 of the rail 202 as shown. However, other shapes such as a triangular prism, a series of pyramidal points, a hemispherical prism, etc. may be used. The one or more features 630 may be coupled to the interior bottom surface of the rail 202 when the end clamp 600 is installed in the rail 202.

The end clamp 600 may also include a toggle 606 disposed inside of the rail 202. The toggle 606 may be disposed between and coupled to both the top of the inner portion 612 and the interior top surface 206 of the rail 202. The toggle 606 may include an aperture 622. The aperture 622 may be threaded to receive a threaded portion of the tail end 636 of the fastener 602. The toggle 606 may also include one or more points 608. The one or more points 608 may be triangular prisms disposed on the topside of the toggle 606 and extending the width of the toggle 606 or they may be one or more rows of pyramidal structures disposed on the underside of the toggle 606. The toggle 606 may be made of any of a number of suitable materials including steel, stainless steel, aluminum, electrically conductive polymer, and/or electrically conductive composite material.

A portion of the clamping plate 604 is disposed outside of the rail 202 and an inner portion 612 of the clamping plate 604 is disposed inside the rail 202. The toggle 606 is also disposed inside of the rail 202. The head end 634 of the fastener 602 is disposed outside of the rail 202 and most of the tail end 636 of the fastener 602 is disposed inside of the rail 202.

The end clamp 600 may be initially installed with the fastener 602 in a disengaged state (i.e., the fastener 602 may be loosely coupled to the rest of the end clamp 600 such that the components of the end clamp 600 are not tightly coupled together). Using a tool (e.g., a wrench, a socket wrench, a screwdriver, etc.) a technician may apply a tightening force 620 to the head end 634 of the fastener 602. The tightening force 620 may cause the fastener 602 to rotate, thus engaging the threaded portion of the tail end 636 of the fastener 602 with the threaded aperture 618. The torque on the fastener 602 causes the fastener 602 to translate in a vertical direction. This moment on the fastener 602 generates a horizontal force 622 directed toward the clamping plate 604 and the resultant horizontal force 624 directed into the rail 202. The moment on the fastener 602 also generates a vertical force 626 directed upward toward the interior top surface of the rail 202 and the resultant downward vertical force 628.

The vertical force 628 pulls the clamping plate 604 downward. Because the lip 610 of the clamping plate 604 is disposed over the lip 512 of the frame 204, the downward force 628 causes the clamping plate 604 to apply downward pressure to the frame 204, thus securing the frame 204 to the rail 202. The vertical force 626 pushes inner portion 612 and the toggle 606 (and one or more points 608) upward toward the interior top surface of the rail 202. The toggle 606 couples to the top surface of the rail 202 through the one or more points 608.

As discussed herein, the tightening force 620 may cause one or more grounding teeth of the fastener 602 to pierce the anodization layer of the clamping plate 604. The downward vertical force 628 may cause the grounding teeth 632 to pierce the anodization layer of the frame 204 as discussed herein. The vertical force 626 acting on the one or more points 608 may cause the one or more points 608 to pierce the anodization layer of the interior top surface of the rail 202. Accordingly an electrical grounding path may be established from the frame 204, through the grounding teeth 632, through the clamping plate 604, through the fastener 602, through the toggle 606, through the one or more points 608, and to the rail 202.

Figure 6B:
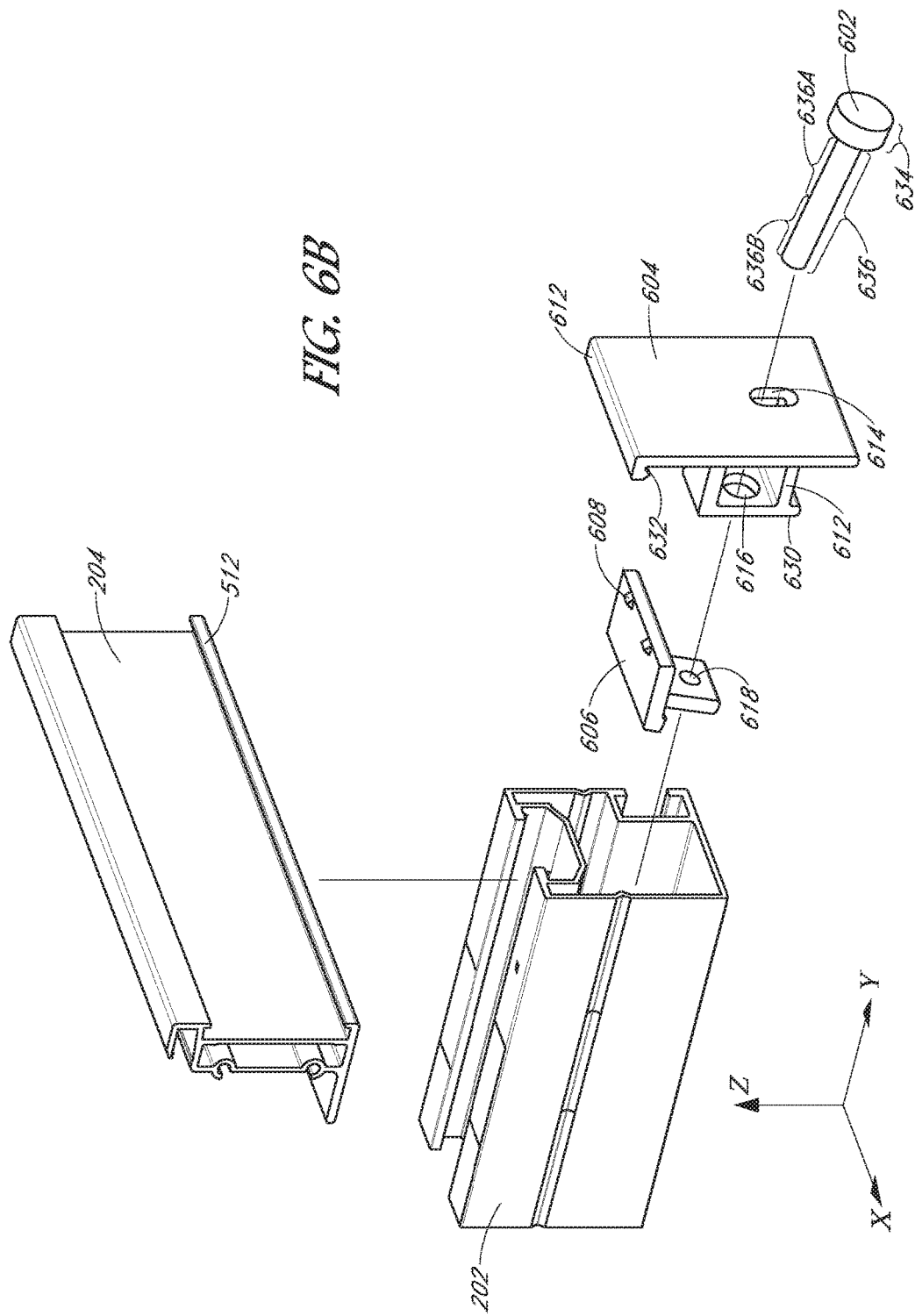
FIG. 6B is an exploded perspective view of the alternative end clamp of FIG. 6A.

Referring now to FIG. 6B, an exploded perspective view of the end clamp 600 and portions of the rail 202 and frame 204 is shown. As discussed herein in reference to FIG. 6A, an end clamp 600 may include a fastener 602, a clamping plate 604, and a toggle 606. The end clamp 600 may be inserted into an end of the rail 202, and when engaged may secure the frame 204 to the rail 202 as discussed herein.

Figure 7:
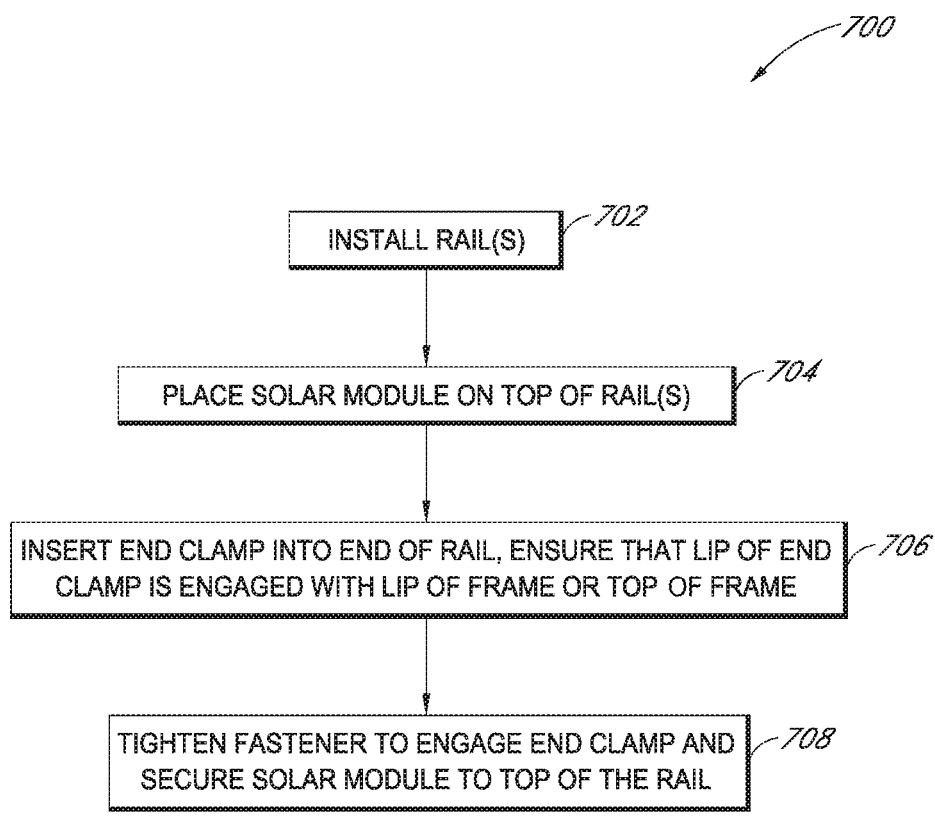
FIG. 7 is a flowchart illustrating an example installation method for an end clamp in accordance with various described embodiments.

Referring now to FIG. 7, a block diagram illustrates a rail, module, and end clamp installation method 700. Before commencing the method 700, the array 110 has already been designed (e.g., the number of solar modules 112 determined, the number of rails 202 determined, the location where each solar module 112 and each rail will be installed) and the components of the array 110 have been delivered to the site. At block 702, one or more technicians install the rails 202 on the support structure 102. At block 704, the one or more technicians place a solar module 112 on top of one or more rails 202. At block 706, the one or more technicians install an end clamp 400 or 600 into an open end of the rail 202. As part of installing the end clamp 400 or 600, the one or more technicians also ensure that the lip 414 or 610 is disposed over and engaged with the lip 512 of the frame 204 (if present) or disposed over and engaged with the top of the frame 204 (if no lip 512 is present).

At block 708, the one or more technicians engages the end clamp 400 or 600 by using a tool (e.g., a screwdriver, a wrench, a socket wrench) to tighten the fastener 402 or 602. As discussed herein with respect to FIG. 5A, when an end clamp 400 is engaged, horizontal forces 504 and 506 pull the inner wedge 410 toward the clamping plate 404 and the clamping plate wedge 406, causing the wedge surface 446 of the clamping plate wedge 4086 to bear against the first wedge surface 448 of the block 408 and the wedge surface 452 of the inner wedge 410 to bear against the second wedge surface 450 of the block 408. A portion of the horizontal forces 504 and 506 is deflected by the inner wedge 410 and the clamping plate wedge 406 upward through the block 408 via by the wedge-shaped bottom portion 442 of the block 408 generating a vertical force 508. The vertical force 508 pushes the block 408 upward toward the interior top surface of the rail 202. Accordingly, the vertical force 508 creates tension on the end clamp 400 resulting in vertical forces 510 and 514. The vertical force 510 pulls the clamping plate 404 downward. Because the lip 414 of the clamping plate 404 is disposed over the lip 512 of the frame 204, the downward force 510 causes the clamping plate 404 to apply downward pressure to the frame 204, thus securing the frame 204 to the rail 202. The vertical force 514 applies downward pressure on the inner wedge 410 and the one or more points 418. The vertical force 514 and horizontal force 504 acting through the one or more points 418 results in a friction force 516 opposing the horizontal force 504.

Alternatively, as discussed herein with respect to FIG. 6A, when an end clamp 600 is engaged, the threaded portion of the tail end 636 of the fastener 602 engages with the threaded aperture 618. The torque on the fastener 602 causes the fastener 602 to translate in a vertical direction. This moment on the fastener 602 generates a horizontal force 622 directed toward the clamping plate 604 and the resultant horizontal force 624 directed into the rail 202. The moment on the fastener 602 also generates a vertical force 626 directed upward toward the interior top surface of the rail 202 and the resultant downward vertical force 628. The vertical force 628 pulls the clamping plate 604 downward. Because the lip 610 of the clamping plate 604 is disposed over the lip 512 of the frame 204, the downward force 628 causes the clamping plate 604 to apply downward pressure to the frame 204, thus securing the frame 204 to the rail 202. The vertical force 626 pushes inner portion 612 and the toggle 606 (and one or more points 608) upward toward the interior top surface of the rail 202. The toggle 606 couples to the top surface of the rail 202 through the one or more points 608.

Once an end clamp 400 or 600 is installed in one rail 202, it may be advantageous to repeat the actions at block 706 and 708 to install additional end clamps 400 or 600 in one or more additional rails 202 to further secure the solar module 112 to the support structure 102. Of course, it will be understood that in addition to human technicians, the rails 202, solar modules 112, and end clamps 400 or 600 may be installed using one or more tools such as robots, hoists, cranes, drones, etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A solar power system comprising:
   a rail having an end, an interior top surface, an interior bottom surface, and an exterior top surface;
   a solar module disposed atop the exterior top surface of the rail; and
   an end clamp, at least a portion of the end clamp disposed inside the rail at the end of the rail, the end clamp comprising:
      a fastener having a head end and a tail end;
      a clamping plate disposed at least partially outside of the rail comprising a clamping plate wedge disposed inside the rail, wherein the clamping plate secures the solar module to the exterior top surface of the rail,
      an inner wedge disposed inside the rail and coupled to the interior bottom surface,
      a block disposed between and engaged with the clamping plate wedge and inner wedge, wherein
   the tail end of the fastener is engaged with the inner wedge to apply a first force in a first horizontal direction on the inner wedge, wherein the head end of the fastener is engaged with the clamping plate to apply a second force in a second horizontal direction on the clamping plate, and wherein the inner wedge and clamping plate wedge impart a vertical force onto the block in a vertical direction to cause the block to engage with the interior top surface.

2. The solar power system of claim 1 wherein:
   the solar module comprises a frame having a top, a bottom, and a channel disposed between the top and bottom, and
   at least a portion of the clamping plate is disposed inside the channel.

3. The solar power system of claim 1 wherein:
   the solar module comprises a frame, and
   at least a portion of the clamping plate is disposed atop the frame.

4. The solar power system of claim 1 wherein:
   the solar module comprises a frame having an anodization layer, and the clamping plate further comprises one or more grounding teeth breaking the anodization layer.

5. The solar power system of claim 1 wherein
   the clamping plate further comprises an anodization layer,
   the fastener comprises one or more grounding teeth adapted to break the anodization layer.

6. The solar power system of claim 1 wherein the clamping plate further comprises one or more drainage features adapted to allow liquid to drain from the rail.

7. The solar power system of claim 1 wherein the clamping plate further comprises a recessed aperture, wherein the head end of the fastener is disposed within the recessed aperture.

8. The solar power system of claim 1 wherein the inner wedge comprises one or more points engaged with the interior bottom surface.

9. The solar power system of claim 1 wherein
   the inner wedge comprises a threaded aperture, the fastener is at least partially threaded,
   and at least some of the threads of the fastener are disposed within and engaged with the threaded aperture.

10. The solar power system of claim 1 wherein
    the solar module comprises a frame, and
    an electrical grounding path is established from the frame through the end clamp, to the rail.

11. The solar power system of claim 10 wherein the electrical grounding path is established from the frame, through the clamping plate, through the fastener, through the inner wedge, to the rail.

12. The solar power system of claim 1 wherein the fastener and inner wedge comprise steel or stainless steel.

13. The solar power system of claim 1 wherein the clamping plate comprises one or more of aluminum, steel, stainless steel, polymer, or composite.

14. The solar power system of claim 1:
    wherein the block includes a first wedge surface and a second wedge surface;
    wherein the clamping plate wedge and the first wedge are shaped to mate with and bear against one another; and
    wherein the inner wedge and the second wedge surface are shaped to mate with and bear against one another.

15. A solar power system comprising:
    a first rail having an end, an interior top surface, an interior bottom surface, and an exterior top surface;
    a second rail having an end, an interior top surface, an interior bottom surface, and an exterior top surface;
    a solar module disposed atop the first rail and the second rail; and
    a first end clamp disposed at least partially inside the first rail at the end of the first rail and a second end clamp disposed at least partially inside the second rail at the end of the second rail, each of the first and second end clamps comprising:
       a fastener having a head end and a tail end;
       a clamping plate disposed at least partially outside of the rail comprising a clamping plate wedge disposed inside the rail, wherein the clamping plate secures the solar module to the exterior top surface of the rail,
       an inner wedge disposed inside the rail coupled to the interior bottom surface,
       a block disposed between and engaged with the clamping plate wedge and inner wedge,
    wherein the tail end of the fastener is engaged with the inner wedge to apply a first force in a first horizontal direction on the inner wedge, wherein the head of the fastener is engaged with the clamping plate to apply a second force in a second horizontal direction on the clamping plate, and wherein the inner wedge and clamping plate wedge cooperate to impart a vertical force onto the block in a vertical direction to cause the block to engage with the interior top surface.

16. A mounting system comprising:
    a rail having an end, an interior top surface, an interior bottom surface, and an exterior top surface; and
    an end clamp, at least a portion of the end clamp disposed inside the rail at the end of the rail, the end clamp comprising:
       a fastener having a head end and a tail end;
       a clamping plate adapted to be disposed at least partially outside of the rail comprising a clamping plate wedge adapted to be disposed inside the rail, wherein the clamping plate is adapted to secure a module to the top of the rail,
       an inner wedge adapted to be disposed inside the rail and coupled to the interior bottom surface,
       a block disposed between and engaged with the clamping plate wedge and inner wedge, wherein
    the tail end of the fastener is engaged with the inner wedge to apply a first force in a first horizontal direction on the inner wedge, the head of the fastener is engaged with the clamping plate to apply a second force in a second horizontal direction on the clamping plate, and the inner wedge and clamping plate wedge deflect the first force and second force onto the block in the vertical direction causing the block to engage with the interior top surface.

17. The mounting system of claim 16 wherein
the clamping plate further comprises an anodization layer,
the fastener comprises one or more grounding teeth adapted to break the anodization layer.

18. The mounting system of claim 16 wherein the clamping plate further comprises a recessed aperture, wherein the head end of the fastener is disposed within the recessed aperture.

19. The mounting system of claim 16 wherein
the inner wedge comprises a threaded aperture, the fastener is at least partially threaded, and
at least some of the threads of the fastener are disposed within and engaged with the threaded aperture.

20. The mounting system of claim 16:
wherein the block includes a first wedge surface and a second wedge surface;
wherein the clamping plate wedge and the first wedge are shaped to mate with and bear against one another; and
wherein the inner wedge and the second wedge surface are shaped to mate with and bear against one another.

* * * * *